United States Patent
Ueda et al.

(10) Patent No.: US 12,540,099 B2
(45) Date of Patent: Feb. 3, 2026

(54) CONCRETE REINFORCING COMPOSITE MATERIAL AND CONCRETE REINFORCING REBAR

(71) Applicant: KABUSHIKI KAISHA KOBE SEIKO SHO (KOBE STEEL, LTD.), Hyogo (JP)

(72) Inventors: Hisai Ueda, Ishikawa (JP); Kiyoshi Uzawa, Ishikawa (JP); Hiroki Matsumoto, Ishikawa (JP); Hiroshi Yamashita, Ishikawa (JP); Hideki Yutaka, Takasago (JP)

(73) Assignee: KABUSHIKI KAISHA KOBE SEIKO SHO (KOBE STEEL, LTD.), Hyogo (JP)

( * ) Notice: Subject to any disclaimer, the term of this patent is extended or adjusted under 35 U.S.C. 154(b) by 176 days.

(21) Appl. No.: 18/699,835

(22) PCT Filed: Sep. 28, 2022

(86) PCT No.: PCT/JP2022/036114
§ 371 (c)(1),
(2) Date: Apr. 9, 2024

(87) PCT Pub. No.: WO2023/067996
PCT Pub. Date: Apr. 27, 2023

(65) Prior Publication Data
US 2024/0400453 A1    Dec. 5, 2024

(30) Foreign Application Priority Data
Oct. 22, 2021   (JP) .................................. 2021-172774

(51) Int. Cl.
C04B 20/10     (2006.01)
C04B 14/42     (2006.01)
(Continued)

(52) U.S. Cl.
CPC .......... *C04B 20/1033* (2013.01); *C04B 14/42* (2013.01); *C04B 14/4668* (2013.01);
(Continued)

(58) Field of Classification Search
None
See application file for complete search history.

(56) References Cited

U.S. PATENT DOCUMENTS

2019/0153671 A1    5/2019   Hachisuka et al.

FOREIGN PATENT DOCUMENTS

JP    2599187 B2     4/1997
JP    H11-124957 A   5/1999

OTHER PUBLICATIONS

Anonymous, "Guidelines (draft) for design and construction of concrete structure using continuous fiber reinforcing materials", 1st edition, Japan Society of Civil Engineers, Sep. 30, 1996, total 6 pages, Japan; with partial English translation.
(Continued)

*Primary Examiner* — Arti Singh-Pandey
(74) *Attorney, Agent, or Firm* — Studebaker Brackett PLLC (57) ABSTRACT

Provided is a concrete reinforcing composite material that is impregnated with a thermoplastic resin having excellent alkali resistance and handleability. In a concrete reinforcing composite material 10, a core material 12 is formed from a fiber bundle of reinforcing fibers. The core material 12 is covered with a coating layer 14 made of a thermoplastic resin. The core material 12 is impregnated with the thermoplastic resin. The thickness of the coating layer 14 is 84 μm or more. The fiber volume content $V_f$ of the core material 12 is 60% or more.

7 Claims, 6 Drawing Sheets

(51) Int. Cl.
  *C04B 14/46* (2006.01)
  *D07B 1/02* (2006.01)
  *D07B 1/16* (2006.01)
  *E04C 5/07* (2006.01)

(52) U.S. Cl.
  CPC .............. *D07B 1/02* (2013.01); *D07B 1/162* (2013.01); *E04C 5/07* (2013.01); *D07B 2201/2009* (2013.01); *D07B 2201/2087* (2013.01); *D07B 2205/201* (2013.01); *D07B 2205/30* (2013.01); *D07B 2205/3003* (2013.01); *D07B 2401/202* (2013.01); *D07B 2501/2023* (2013.01)

(56) References Cited

OTHER PUBLICATIONS

Kanayama, Kenji, "Basalt Fibers", Seikei-Kakou, vol. 33, No. 4, 2021, Journal of the Japan Society of Polymer Processing, pp. 117-120, Japan; with partial English translation.

Katsuki, Futoshi et al., "Durability evaluation of glass fiber reinforced plastic rods under alkaline environment", Journal of Materials, Concrete Structures and Pavements, vol. 32, No. 544, Aug. 1996, pp. 101-107, Japan; with partial English translation.

CONCRETE REINFORCING COMPOSITE MATERIAL AND CONCRETE REINFORCING REBAR

TECHNICAL FIELD

The present invention relates to a concrete reinforcing composite material and a concrete reinforcing rebar.

BACKGROUND ART

A reinforced concrete structure is aging since a steel rebar used for the reinforced concrete structure is easily eroded by water, salt, etc. Therefore, in order to extend the life of a concrete structure, use of a composite material of fiber-reinforced plastic (FRP), etc. serving as an alternative of the steel rebar is proposed. For example, Patent Document 1 describes a concrete reinforcing material using thermosetting resin. In manufacture of the concrete reinforcing material described in Patent Document 1, it takes some time after thermosetting resin is impregnated with reinforced fiber until the resin is solidified by thermal curing reaction. Therefore, production efficiency is low and manufacturing cost is high. In addition, after once solidified, the thermosetting resin cannot be softened by heating. Thus, it is not possible to perform secondary processing such as bending processing. Therefore, a concrete reinforcing material impregnated with thermoplastic resin in place of the thermosetting resin is devised.

CITATION LIST

Patent Document

Patent Document 1: JP H11-124957 A

SUMMARY OF THE INVENTION

An object of the present invention is to provide a concrete reinforcing composite material impregnated with thermoplastic resin, whose alkali resistance and handling ability are favorable.

The present inventors have reached the present invention as a result of earnest examination to solve the problem described above.

That is, a concrete reinforcing composite material according to a first aspect of the present invention includes a core formed by a fiber bundle of reinforced fiber, and a coating layer of thermoplastic resin, the coating layer coating the core, wherein the core is impregnated with the thermoplastic resin, a thickness of the coating layer is not less than 84 μm (preferably, not less than 84.8 μm, and more preferably, not less than 85 μm), and a fiber volume content $V_f$ of the core is not less than 60%.

DESCRIPTION OF EMBODIMENTS

As described above, the concrete reinforcing material impregnated with the thermoplastic resin is devised. However, in the concrete reinforcing material impregnated with the thermoplastic resin, there is room to improve alkali resistance and handling ability.

According to the present disclosure, it is possible to provide a concrete reinforcing composite material impregnated with thermoplastic resin, whose alkali resistance and handling ability are favorable.

Hereinafter, an embodiment for carrying out the present disclosure will be described in detail with reference to the drawings, etc. The embodiment does not restrict the invention but only illustrates an example. All characteristics described in the embodiment and combinations of the characteristics are not necessarily essential to the invention.

(Concrete Reinforcing Composite Material)

Figure 1:
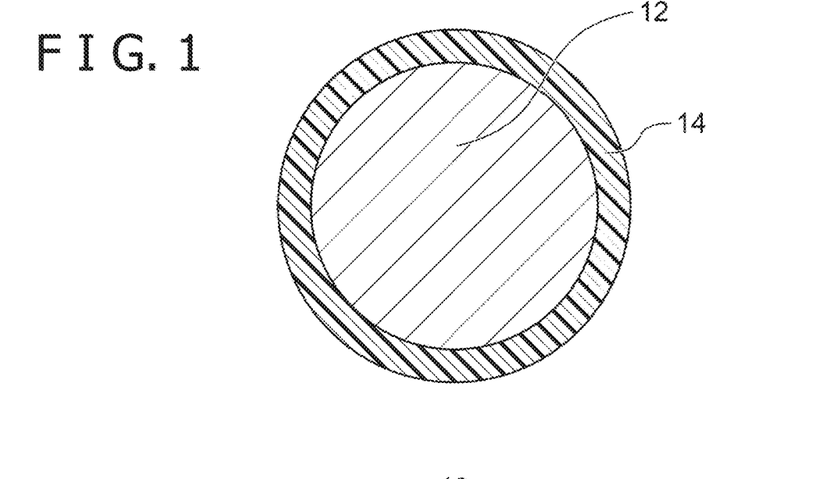
FIG. 1 is a sectional view of a horizontal section of a concrete reinforcing composite material according to an embodiment.
Figure 2:
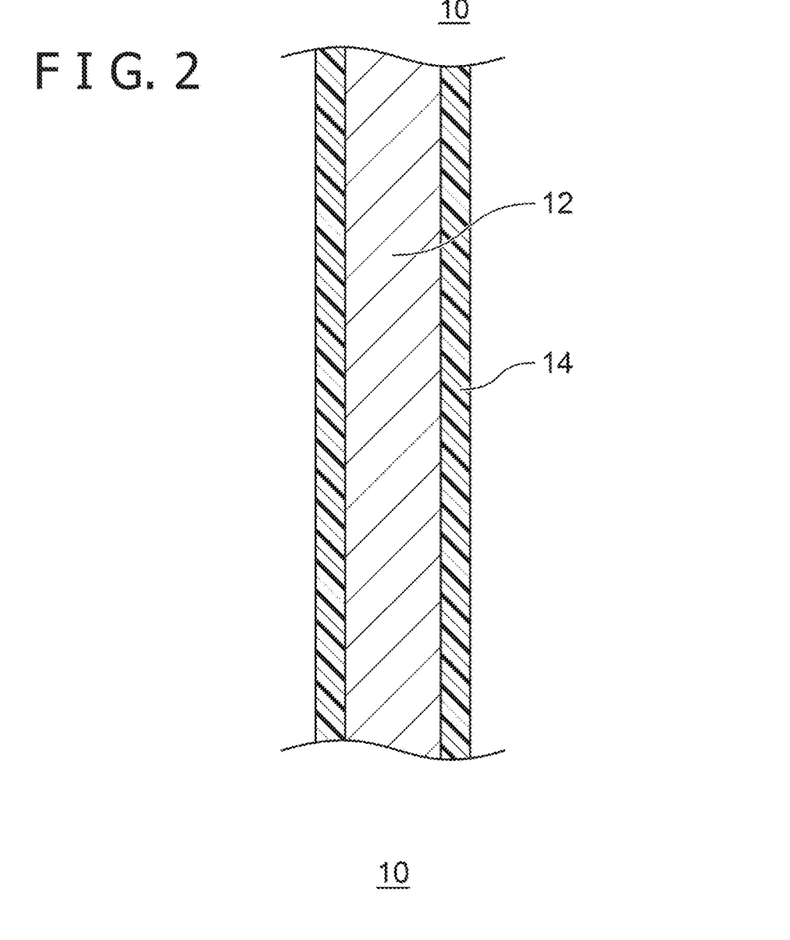
FIG. 2 is a sectional view of a vertical section of the concrete reinforcing composite material according to the embodiment.

FIG. 1 is a sectional view of a horizontal section of a concrete reinforcing composite material according to the embodiment. The reference numerals in FIG. 1 denote a concrete reinforcing composite material 10, a core 12, and a coating layer 14. FIG. 2 is a sectional view of a vertical section of the concrete reinforcing composite material according to the embodiment. The concrete reinforcing composite material (hereinafter, also simply referred to as the composite material) 10 shown in FIGS. 1 and 2 includes the core 12 formed by a fiber bundle of reinforced fiber, and the coating layer 14 of thermoplastic resin, the coating layer coating the core 12.

The core 12 is impregnated with the thermoplastic resin, a thickness of the coating layer 14 is not less than 84 μm (preferably, not less than 84.8 μm, and more preferably, not less than 85 μm), and a fiber volume content $V_f$ of the core 12 is not less than 60%. Since the core 12 is impregnated with the thermoplastic resin and the thickness of the coating layer and the fiber volume content $V_f$ are within such ranges, it is possible to provide the concrete reinforcing composite material with high alkali resistance, high strength, and high flexibility, with which it is possible to perform secondary processing such as bending processing. The thickness of the coating layer 14 is a thickness of the coating layer measured at twenty points. That is, the phrase "thickness of the coating layer 14 is not less than 84 μm (preferably, not less than 84.8 μm, and more preferably, not less than 85 μm)" means that all values measured at the twenty points are within a range of not less than 84 μm (preferably, not less than 84.8 μm, and more preferably, not less than 85 μm). The fiber volume content $V_f$ of the core is the volume percent of the reinforced fiber with respect to the core calculated from an X-ray CT image of the horizontal section of the composite material.

From the viewpoint of further improving the alkali resistance and the strength, the thickness of the coating layer 14 is preferably not less than 250 μm, and more preferably, 320 μm.

Preferably, a non-circularity of the concrete reinforcing composite material 10 is 1% to 5%, and a non-circularity of the core 12 is 1% to 6%. Since the non-circularity of the concrete reinforcing composite material 10 and the non-circularity of the core 12 are respectively within the ranges described above, it is possible to improve formability of the composite material. Specifically, since these non-circularities are respectively within the ranges described above, the thickness of the coating layer is uniform in the section. As a result, the fiber does not easily project from a surface, and a fluff is suppressed. By the suppression of the fluff, contact between a die and the fiber is suppressed in a pultrusion process after impregnation. Therefore, it is possible to suppress fiber rupture, that is, it is possible to improve the formability.

The lower the non-circularity is, the closer a shape of the horizontal section of the composite material comes to the perfect circle. The "non-circularity" is calculated by the following equation.

$$\text{Non-circularity (\%)} = (a - b)/c \times 100 \quad (1)$$

wherein the reference sign a denotes an average value of long diameters of the horizontal section at five points, the reference sign b denotes an average value of short diameters of the horizontal section at five points, and the reference sign c denotes an average value of average diameters of the horizontal section at five points. Specifically, the values a, b, and c are calculated as follows from the X-ray CT images of the horizontal sections. For a single horizontal section, the long diameter and the short diameter are respectively measured three times (N=3), and respective average values are calculated. Further, an average value of all the measured long and short diameters (nine measured values) is calculated as the average diameter. The long dimeters, the short diameters, and the average diameters of the horizontal section at five points are respectively averaged, and the values a, b, and c of the equation (1) are determined. The non-circularity of the concrete reinforcing composite material is calculated from X-ray CT images of the horizontal section at five points including both the core and the coating layer of this composite material. The non-circularity of the core is calculated from the horizontal section at five points of the core excluding the coating layer in the X-ray CT images of the horizontal section of the composite material.

A twist angle of the reinforced fiber included in the core 12 is preferably 0.0870 to 15°. When the twist angle is within this range, it is possible to improve the formability of the composite material. Specifically, when the reinforced fiber is twisted, the fiber comes close to center in the pultrusion process. Therefore, the contact between the die and the fiber is suppressed in the pultrusion process. Thereby, it is possible to suppress the fiber rupture, that is, it is possible to improve the formability. The "twist angle" is an average value of twist angles of the fiber measured at three points from a point close to center of a vertical section of the composite material (center of the core) to a point close to the coating layer. For example, in a case where a diameter of the composite material is thin, the twist angles are measured at intervals of 0.25 mm from a distance from the center of 0.25 mm, and an average value of three points for each distance is determined. In a case where the diameter of the composite material is thick, the twist angles are measured at intervals of 0.5 mm from a distance from the center of 0.5 mm, and an average value of three points for each distance is determined. In such a way, in a case where the twist angles are measured at equal intervals from the center to the point close to the coating layer, all the twist angles are preferably within the range described above.

The twist angle of the reinforced fiber is preferably proportional to the distance from the center of the core. According to this, it is possible to improve the formability and handling ability of the composite material.

The thermoplastic resin is preferably polyolefin resin. According to this, it is possible to provide the composite material which is inexpensive and excellent in chemical resistance and water resistance, with which the secondary processing such as the bending processing is easily performed. Examples of the polyolefin resin include polyethylene and polypropylene. Polypropylene is preferable as it is more inexpensive.

The reinforced fiber of the core 12 is preferably at least one type selected from the group consisting of glass fiber, basalt fiber, carbon fiber, and aramid fiber.

It is possible to adjust a fiber diameter, a fineness, and the number of the reinforced fiber in accordance with size of a target composite material. For example, the fiber diameter may be 7 μm to 19 μm. For example, the fineness may be 2,400 tex to 24,000 tex. For example, the number of the reinforced fiber may be 8,000 to 120,000.

(Manufacturing Method of Concrete Reinforcing Composite Material)

Figure 3:
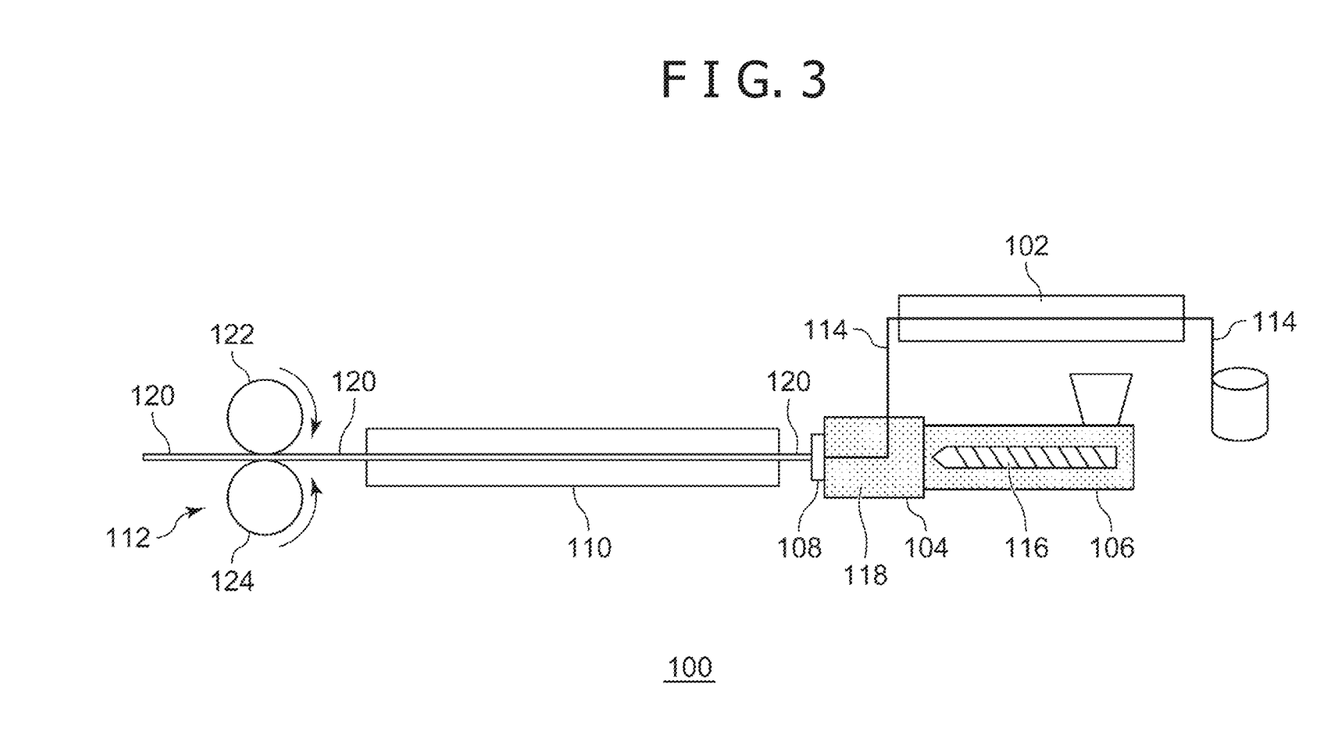
FIG. 3 is a schematic view showing a manufacturing apparatus of the concrete reinforcing composite material according to the embodiment.

Hereinafter, a manufacturing method of the concrete reinforcing composite material according to the embodiment will be described. The concrete reinforcing composite material according to the embodiment can be manufactured by pultrusion. FIG. 3 is a schematic view showing a manufacturing apparatus of the concrete reinforcing composite material according to the embodiment. A manufacturing apparatus 100 shown in FIG. 3 includes a roving heater 102, an impregnation head 104, an extruder 106, a die 108, a cooling device 110, and a pulling machine 112.

As shown in FIG. 3, a fiber bundle (roving bundle) 114 of the reinforced fiber (roving) is guided to the roving heater 102 for pre-heating. On the downstream side of the roving heater 102, the impregnation head 104 and the extruder 106 including a screw 116 are provided. Molten thermoplastic resin (molten resin) 118 is continuously supplied to the impregnation head 104 from the extruder 106. The die 108 is attached to an outlet of the impregnation head 104. The die 108 shapes a concrete reinforcing composite material 120 formed by a twisted resin-impregnated fiber bundle of a high temperature, the fiber bundle pulled from the impregnation head 104.

On the downstream side of the impregnation head 104, the cooling device 110 that cools the composite material 120 of a high temperature from the impregnation head 104 in cooling water. On the downstream side of the cooling device 110, the pulling machine 112 including a pair of rollers 122, 124 is provided. The pulling machine 112 twists the resin-impregnated fiber bundle by the rollers 122, 124 and pulls the composite material 120 from the upstream side.

Figure 4:
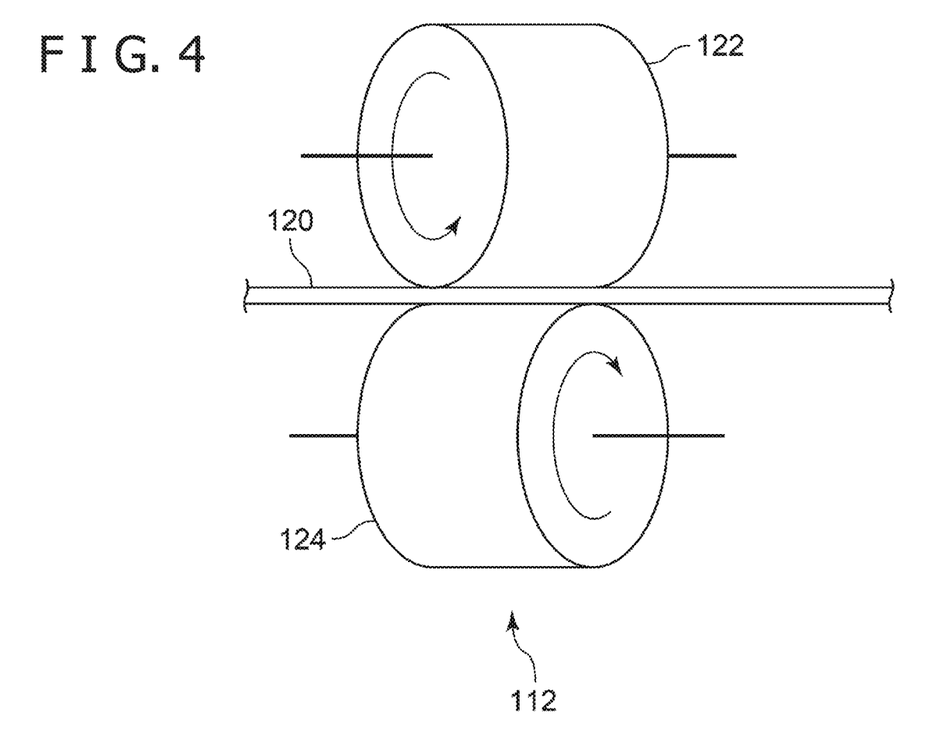
FIG. 4 is a view for explaining a pulling machine in FIG. 3.
Figure 5:
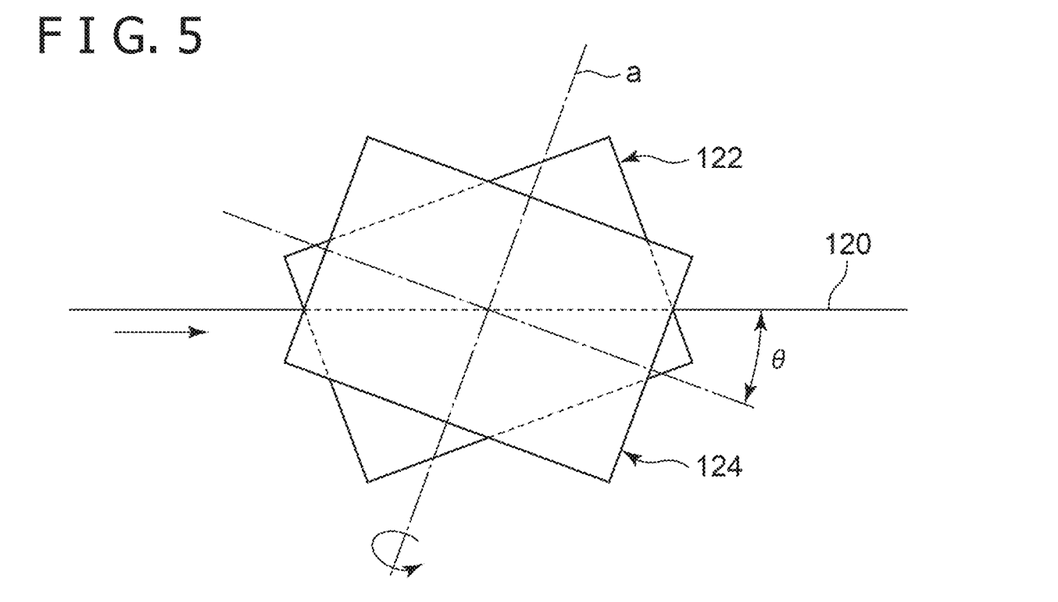
FIG. 5 is a view for explaining angles of rollers shown in FIG. 4.

FIG. 4 is a view for explaining the pulling machine in FIG. 3. FIG. 5 is a view for explaining angles of rollers shown in FIG. 4. The pulling machine 112 includes the pair of rollers 122, 124 arranged to oppose each other so as to sandwich the composite material 120 from the upstream side in a state where rotation axes are respectively held on a parallel plane (horizontal plane) and the rotation axes cross each other. The rotation axis of the roller 122 on the upper side in the FIG. 4 and the rotation axis of the roller 124 on the lower side are not set in directions orthogonal to the pulling direction (running direction) of the composite material 120. These rotation axes are set in directions opposing each other with respect to the pulling direction in a plan view and set at the same angle in directions displaced at a predetermined angle.

As shown in FIG. 5, in a plan view, an angle made by a line orthogonal to the rotation axis a of the roller 122 (124) and the pulling direction (running direction) of the composite material 120 is defined as a roller angle 2θ. It is noted that in the rollers 122, 124 made of metal, minute projections and recesses by knurling are formed over the entire roller surfaces (roller outer peripheral surfaces).

In the manufacturing apparatus 100 configured in such a way, first, the fiber bundle 114 is heated by the roving heater 102, and guided into the impregnation head 104. The fiber bundle 114 receives resin impregnation in the impregnation head 104 filled with the molten resin 118 of a high temperature supplied form the extruder 106, and the resin-impregnated fiber bundle is formed. Regarding this resin-impregnated fiber bundle, by a twisting action by the rollers 122, 124, a twist is generated and grown in the impregnation head 104. In such a way, while impregnating the fiber bundle 114 with the molten resin 118 supplied from the extruder 106, the resin-impregnated fiber bundle is twisted. Then, the composite material 120 formed by the twisted resin-impregnated fiber bundle is continuously pulled from the impregnation head 104.

The composite material 120 of a high temperature continuously pulled after being brought from the impregnation head 104 through the die 108 is cured by cooling by the cooling device 110, and guided to the rollers 122, 124. The twisting action and pulling are performed to the composite material 120 cooled by the cooling device 110 by the rollers 122, 124 in which a predetermined twist angle θ is set. In such a way, it is possible to obtain the concrete reinforcing composite material according to the embodiment.

(Concrete Reinforcing Rebar)

A concrete reinforcing rebar according to the embodiment includes the concrete reinforcing composite material described above. For example, the composite material serves as a wire, and by bounding or twisting several wires, the diameter is thickened to correspond to a steel rebar. Thereby, it is possible to obtain the concrete reinforcing rebar. The concrete reinforcing rebar according to the embodiment is a concrete reinforcing rebar with high alkali resistance and high strength, with which the secondary processing such as the bending processing is easily performed, the concrete reinforcing rebar being lighter than a steel rebar. In addition, the concrete reinforcing rebar according to the embodiment can be manufactured at low cost.

The outline of the present invention is described above. The concrete reinforcing composite material and the concrete reinforcing rebar in the embodiment of the present invention will be summed up as follows.

A concrete reinforcing composite material according to a first aspect of the present invention includes a core formed by a fiber bundle of reinforced fiber, and a coating layer of thermoplastic resin, the coating layer coating the core, wherein the core is impregnated with the thermoplastic resin, a thickness of the coating layer is not less than 84 μm (preferably, not less than 84.8 μm, and more preferably, not less than 85 μm), and a fiber volume content $V_f$ of the core is not less than 60%.

In the concrete reinforcing composite material described above, preferably, a non-circularity of the concrete reinforcing composite material is 1% to 5%, and a non-circularity of the core is 1% to 6%.

In the concrete reinforcing composite material described above, more preferably, a twist angle of the reinforced fiber is 0.087° to 15°.

In the concrete reinforcing composite material described above, further preferably, a twist angle of the reinforced fiber is proportional to a distance from center of the core.

In the concrete reinforcing composite material described above, particularly preferably, the thermoplastic resin is polyolefin resin.

In the concrete reinforcing composite material described above, preferably, the reinforced fiber is at least one type selected from the group consisting of glass fiber, basalt fiber, carbon fiber, and aramid fiber.

A concrete reinforcing rebar according to a second aspect of the present invention contains the concrete reinforcing composite material according to the first aspect of the present invention.

EXAMPLES

Hereinafter, the present invention will be described further in detail with examples. However, these examples do not restrict the present invention at all.

(Manufacture of FRP Strand Rod)

FRP rods were manufactured with using a pultrusion apparatus manufactured by KOBE STEEL, LTD. A manufacturing process is as described above with reference to FIGS. 3 to 5. Basalt fiber (BF) was used as the reinforced fiber, and five FRP strand rods (Examples 1 to 3 and Comparative Examples 1, 2) were experimentally produced. In a matrix, approximately a few % of a compatibilizing agent was added to polypropylene (PP) with high fluidity. BF having a fiber diameter of 17 μm or a fineness of 4,800 tex was used. The interior of the formed FRP rods were observed by X-ray CT (manufactured by ZEOSS), and non-circularities and fiber volume contents $V_f$ were calculated. In addition, a tensile test was conducted with using a universal testing machine (manufactured by Shimadzu Corporation.), and a load retention rate was calculated by an equation: (tensile breaking load after alkali immersion/tensile breaking load before alkali immersion)×100.

Alkali resistance evaluation of the FRP rods based on JIS A 1193: 2005 was performed. An alkali solution imitating a pore solution of concrete is adjusted to have 60° C. and PH 12.5 to 13.0, and the manufactured FRP rods were immersed in the solution for 28 days within a thermostatic bath. After that, loads were measured by the tensile test. Measurement results were evaluated on a scale from 1 to 3 of "Excellent" (load retention rate of not less than 95%), "Good" (load retention rate of 90 to 94%), and "Poor" (load retention rate of not more than 89%). In addition, the handling ability was evaluated based on sensitivity evaluation in which FRP rod surfaces were scrubbed with bare hand and based on whether or not there is fiber projection on the surfaces by the X-ray CT. The evaluation was performed on a scale from 1 to 3 of "Excellent" (fiber does not stab the hand and there is no projection), "Good" (fiber does not stab the hand but fine fiber projection with yarn breakage is recognized), and "Poor" (fiber stabs the hand).

Figure 6:
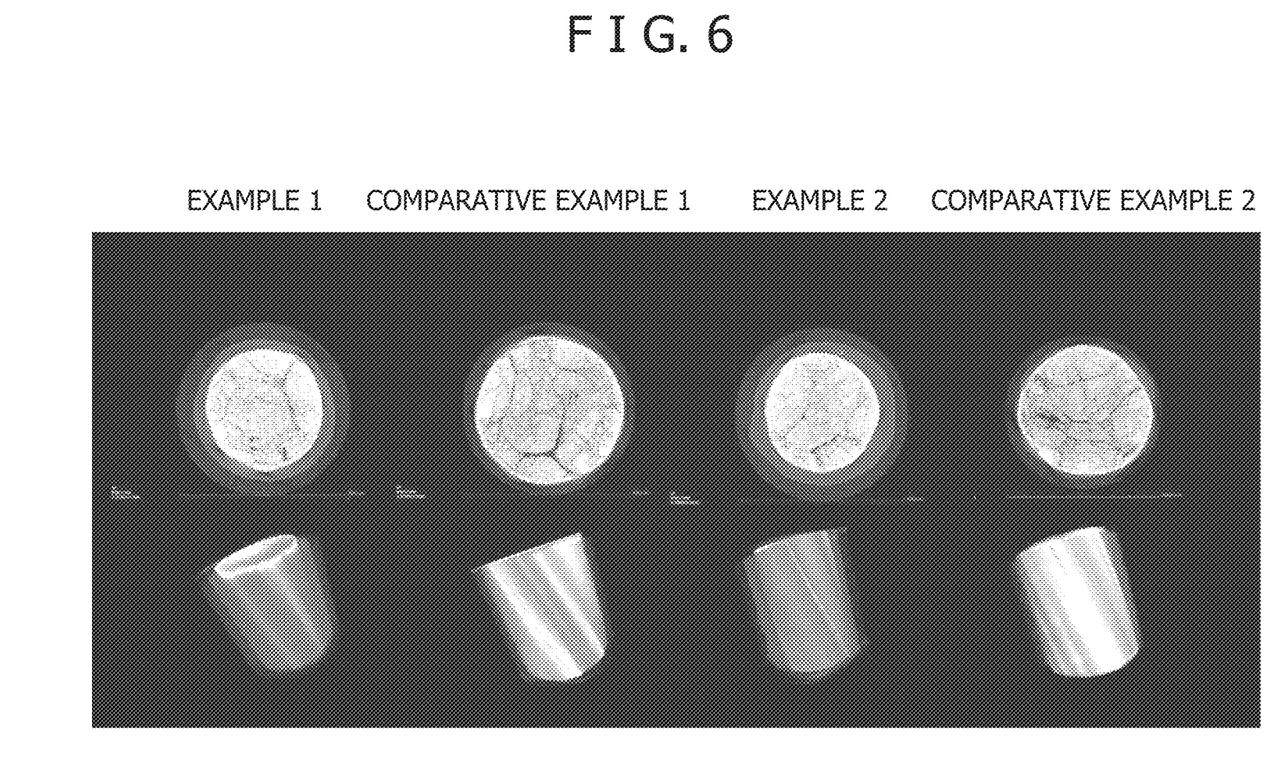
FIG. 6 is X-ray CT images of FRP rods of Examples 1, 2 and Comparative Examples 1, 2.

X-ray CT images of Examples 1, 2 and Comparative Examples 1, 2 are shown in FIG. 6. Example 1 is an FRP rod of three rovings manufactured by a die of Φ 4.8 mm. Example 2 is an FRP rod of three rovings manufactured by a die of Φ 5.0 mm. Comparative Example 1 is an FRP rod of four rovings manufactured by a die of Φ 4.8 mm. Comparative Example 2 is an FRP rod of four rovings manufactured by a die of Φ 5.0 mm. From FIG. 6, it is found that a coating layer by PP resin is reliably formed in Examples 1, 2.

Characteristics of the FRP rods of Examples 1 to 3 and Comparative Examples 1, 2 are shown in Table 1. Example 3 is an FRP rod of four rovings manufactured by a die of Φ 5.0 mm.

| | COMPARATIVE EXAMPLE 1 | COMPARATIVE EXAMPLE 2 | EXAMPLE 1 | EXAMPLE 2 | EXAMPLE 3 |
|---|---|---|---|---|---|
| Coating Layer Thickness Range (μm) | 22.5 ≤ x ≤ 135 | 18 ≤ x ≤ 228.3 | 245.7 ≤ x ≤ 419.4 | 324.6 ≤ x ≤ 553 | 84.8 ≤ x ≤ 319.65 |
| Composite Material Non-circularity (%) | 2.1 | 2.8 | 1.8 | 3.1 | 2.3 |
| Core Non-circularity (%) | 1.1 | 2.0 | 2.8 | 3.8 | 3.1 |
| Load Retention Rate (%) | 31 | 59 | 93 | 100 | 100 |
| Core Vf (%) (X-ray CT) | 75.8 | 69.9 | 62.3 | 63.3 | 69.9 |
| Alkali Resistance | Poor | Poor | Good | Excellent | Excellent |
| Handling Ability | Poor | Poor | Good | Excellent | Good |

From Table 1, it is found that the FRP rods of Examples 1, 2 in which the thickness of the coating layer is not less than 84 μm and the fiber volume content $V_f$ of the core is not less than 60% are excellent in the strength, the alkali resistance, and the handling ability in comparison to Comparative Examples 1, 2. In addition, it is found that the FRP rod of Example 3 in which the thickness of the coating layer is not less than 84 μm and the fiber volume content $V_f$ of the core is not less than 60% is also excellent in the strength, the alkali resistance, and the handling ability in comparison to Comparative Examples 1, 2.

Next, the following samples were experimentally produced. From the X-ray CT (manufactured by ZEOSS) of the experimentally produced FRP rods, the twist angles (values obtained by averaging values of twist angles measured at three points for each distance) were calculated.

Example 4

Fiber: glass fiber (GF), core $V_f$ (calculated by image analysis by X-ray CT) of 80.2%, and roller angle 2θ (at the time of forming) of 10 degrees Example 5

Fiber: GF, core $V_f$ (calculated by image analysis by X-ray CT) of 63.9%, and roller angle 2θ (at the time of forming) of 30 degrees Example 6

Fiber: GF, core $V_f$ (calculated by image analysis by X-ray CT) of 82.5%, and roller angle 2θ (at the time of forming) of 60 degrees Example 7

Fiber: basalt fiber (BF), core $V_f$ (calculated by image analysis by X-ray CT) of 80.5%, and roller angle 2θ (at the time of forming) of 30 degrees Example 8

Fiber: BF, core $V_f$ (calculated by image analysis by X-ray CT) of 61.5%, and roller angle 2θ (at the time of forming) of 30 degrees The twist angles of Examples 4 to 8 are as follows.
Example 4: 0.87 to 3.82 degrees (distance from center of 0.25, 0.5, 0.75, 1.0 mm)
Example 5: 1.59 to 5.61 degrees (distance from center of 0.25, 0.5, 0.75 mm)
Example 6: 3.38 to 14.27 degrees (distance from center of 0.25, 0.5, 0.75 mm)
Example 7: 1.9 to 10.46 degrees (distance from center of 0.5, 1.0, 1.5 mm)
Example 8: 3.11 to 14.78 degrees (distance from center of 0.5, 1.0, 2.0, 2.5 mm)

Figure 7:
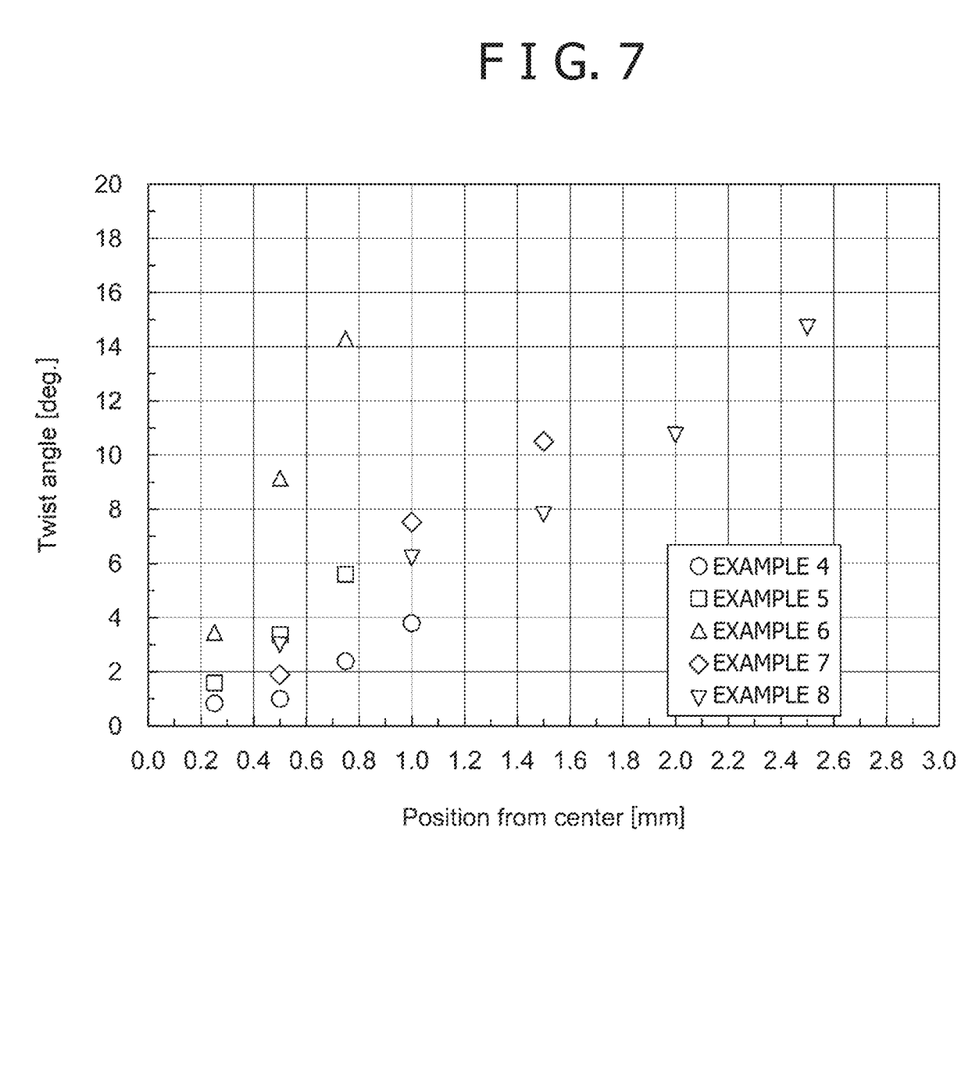
FIG. 7 is a graph showing relationships between twist angles and distances from center of Examples 4 to 8.

Relationships between the twist angles of Examples 4 to 8 and the distances from the center of the core are shown in FIG. 7. From FIG. 7, it is found that the twist angles are proportional to the distances from the center of the core.

Figure 8:
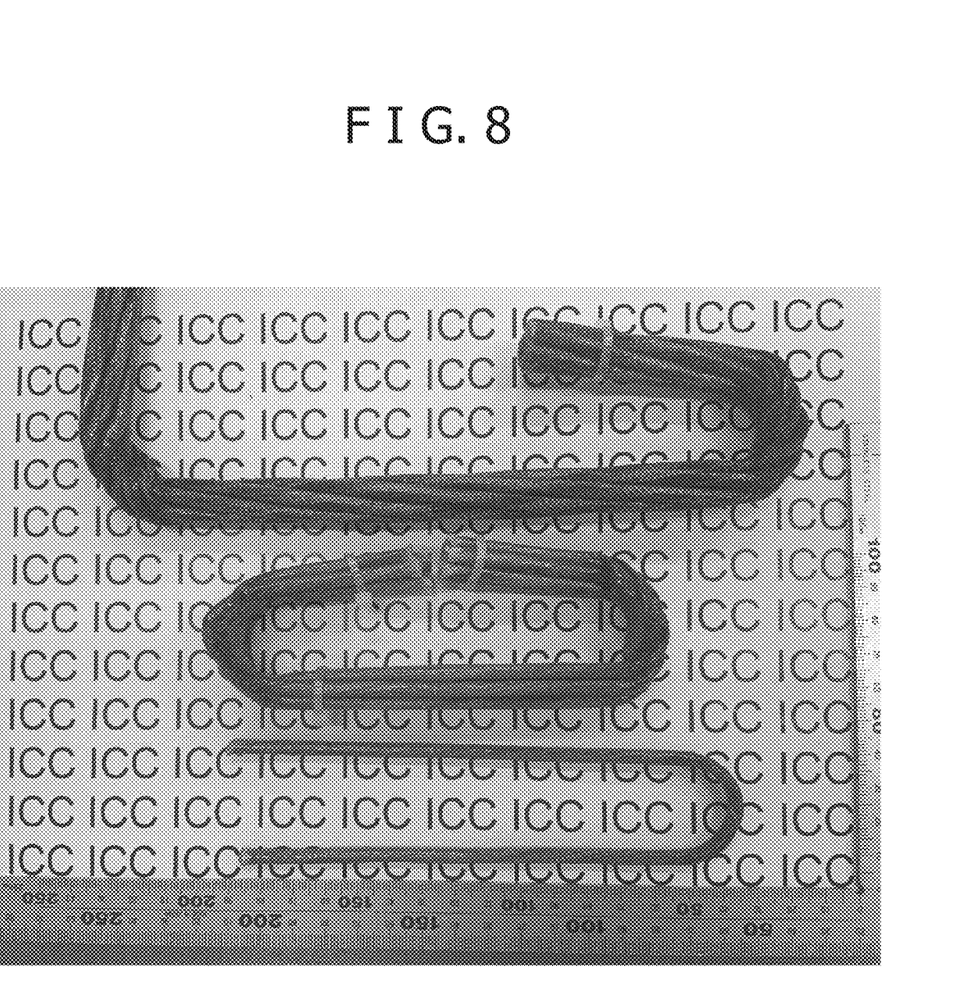
FIG. 8 is a photograph showing BFPP bent at 90 degrees and BFPP bent at 180 degrees.

An FRP rod (made of basalt fiber and polypropylene, and also referred to as the BFPP hereinafter) whose diameter is increased by bundling and twisting was produced. A rope of the BFPP was twisted under cooperation of KOMATSU MATERE Co., Ltd. FIG. 8 is a photograph showing the BFPP bent at 90 degrees and the BFPP bent at 180 degrees. It was confirmed that the bending processing can be more easily performed with hot air using a heat gun.

The present application is based on Japanese Patent Application No. 2021-172774 filed in Oct. 22, 2021, and contents thereof are included in the present application.

The embodiment and the examples disclosed herein should be interpreted as not a limitation but examples in all respects. The scope of the present invention is specified not by the above description but by the claims and intended to include equal meanings to the claims and all the changes within the claims.

INDUSTRIAL APPLICABILITY

The concrete reinforcing composite material of the present invention can be utilized as a concrete reinforcing rebar.

The invention claimed is:
1. A concrete reinforcing composite material, comprising:
a core formed by a fiber bundle of reinforced fiber; and
a coating layer of thermoplastic resin, the coating layer coating the core, wherein
the core is impregnated with the thermoplastic resin, a thickness of the coating layer is not less than 84 μm, and a fiber volume content $V_f$ of the core is not less than 60%.
2. The concrete reinforcing composite material according to claim 1, wherein
a non-circularity of the concrete reinforcing composite material is 1% to 5%, and a non-circularity of the core is 1% to 6%.
3. The concrete reinforcing composite material according to claim 1, wherein
a twist angle of the reinforced fiber is 0.087° to 15°.
4. The concrete reinforcing composite material according to claim 1, wherein
a twist angle of the reinforced fiber is proportional to a distance from center of the core.
5. The concrete reinforcing composite material according to claim 1, wherein
the thermoplastic resin is polyolefin resin.

6. The concrete reinforcing composite material according to claim 1, wherein
the reinforced fiber is at least one type selected from the group consisting of glass fiber, basalt fiber, carbon fiber, and aramid fiber.

7. A concrete reinforcing rebar containing the concrete reinforcing composite material according to claim 1.

* * * * *